United States Patent [19]
Sharman

[11] Patent Number: 5,970,453
[45] Date of Patent: Oct. 19, 1999

[54] METHOD AND SYSTEM FOR SYNTHESIZING SPEECH

[75] Inventor: Richard Anthony Sharman, Highfield, United Kingdom

[73] Assignee: International Business Machines Corporation, Armonk, N.Y.

[21] Appl. No.: 08/489,179

[22] Filed: Jun. 9, 1995

[30] Foreign Application Priority Data

Jan. 7, 1995 [GB] United Kingdom ................... 9500284

[51] Int. Cl.$^6$ ................................ G10L 5/02; G10L 9/00
[52] U.S. Cl. ............................................ 704/260; 704/258
[58] Field of Search ................... 395/2.67, 2.64, 395/2.65, 2.63, 2.54, 2.69

[56] References Cited

U.S. PATENT DOCUMENTS

| | | | |
|---|---|---|---|
| 4,521,907 | 6/1985 | Amir et al. | 704/258 |
| 4,692,941 | 9/1987 | Jacks et al. | 395/2.67 |
| 4,833,712 | 5/1989 | Bahl et al. | 395/2.65 |
| 4,882,759 | 11/1989 | Bahl et al. | 704/243 |
| 5,031,217 | 7/1991 | Nishimura | 395/2.65 |
| 5,033,087 | 7/1991 | Bahl et al. | 704/251 |
| 5,165,007 | 11/1992 | Bahl et al. | 704/256 |
| 5,199,077 | 3/1993 | Wilcox et al. | 395/2.6 |
| 5,230,037 | 7/1993 | Giustiniani et al. | 395/2.69 |
| 5,353,377 | 10/1994 | Kuroda et al. | 395/2.65 |
| 5,502,791 | 3/1996 | Nishimura et al. | 395/2.65 |

*Primary Examiner*—Forester W. Isen
*Assistant Examiner*—Patrick N. Edouard

[57] ABSTRACT

A method and system for synthesizing acoustic waveforms in, for example, a text-to-speech system is disclosed which employs the concatenation of a very large number of very small, sub-phoneme, acoustic units. Such sub-phoneme sized audio segments, called wavelets, can be individually spectrally analyzed and labelled as fenones. Fenones are clustered into logically related groups called fenemes. Sequences of fenemes can be matched with individual phonemes, and hence words. In the case of a text-to-speech system, the required phonemes are determined from prior linguistic analysis of the input words in the text. Suitable sequences of fenemes are predicted for each phoneme in its own context using hidden markov modelling techniques. A complete output waveform is constructed by concatenating wavelets to produce a very long sequence thereof, each wavelet corresponding to its respective feneme. The advantages of using a feneme set extracted from a training script read by a single human speaker is that it is possible to generate natural sounding speech, using a finite sized codebook.

25 Claims, 6 Drawing Sheets

A block diagram of the system components required for speaker-dependent speech synthesis

A block diagram of the system components required for speaker-dependent speech synthesis

METHOD AND SYSTEM FOR SYNTHESIZING SPEECH

DESCRIPTION

The present invention relates to a method and system for synthesizing speech.

One of the objectives of a text-to-speech (TTS) system is to convert a sequence of one or more words into an acoustic waveform which will be as acceptable to a human listener as if the words had been spoken naturally. Automatic synthesis of waveforms from text is required when the contents of an intended message are not known in advance, and so pre-recording the waveform is not possible. This can occur, for example, when electronic mail messages must be read over the telephone to a remote user. Many methods of converting text to speech have been proposed (see, for example, J. N. Holmes, Speech Synthesis and Recognition, Van Norstrand Reinhold(UK), 1988) and a wide variety of implementation techniques have been studied (see, for example, G. Bailly, C. Benoit and T. R. Sawallis, Ed, Talking Machines, Models and Designs, Elsevier, 1992). The standard methods, such as those disclosed in J. Allen, M. S. Hunnicutt and D. Klatt, From Text to Speech: The MITALK system, Cambridge University Press, 1987, have been shown to have high intelligibility using both rhyme and comprehension tests. However, most existing techniques, and thus also commercially available systems, produce sound which is less natural, and usually less acceptable, than human speech. In some applications, such as human orientated computer interaction, noisy, or stressful situations, the requirement for more natural sounding speech is thought to be important.

A common method of creating speech output is to use samples of speech taken from a recorded human voice. Since only a finite amount of recorded material can be obtained, it is thus necessary to segment and re-assemble the actual recordings to create new utterances. The most common units of segmentation used have been phonemes (as disclosed in J. Olive, Speech Synthesis by Rule, Speech Communication, Ed G. Fant, vol. 2, Proceedings of the speech communication seminar, Stockholm, 1974. J. N. Holmes, Speech Synthesis and Recognition, Van Norstrand Reinhold(UK), 1988), diphones (as disclosed in F. Charpentier and M. Stella, Diphone Synthesis using an overlap-add technique for speech waveforms concatenation, in ICASSP 86 (Tokyo) pp 2015–2018), and demi-syllables (as disclosed in M. Macchi and M. Speigel, Using a demi-syllable inventory to synthesize names, in Speech Tech 90, Proceedings Voice Input/Output Applications conference and exhibition, Media Dimensions Inc., New York, 1990. Waveform synthesis by the concatenation of segments of naturally spoken speech has the potential to improve the quality of speech derived therefrom as compared to other methods of speech synthesis, such as formant-based methods, because it has the ability to precisely model the speech characteristics of a given human speaker and so achieve a more natural speech quality.

One difficulty with concatenative synthesis is the decision of exactly what type of segment to select. Long phrases exactly reproduce the actual utterance originally spoken, and are widely used in Interactive-Voice-Response (IVR) systems. Such segments are very difficult to modify or extend for even quite trivial changes in the text. Phoneme sized segments can be extracted from aligned phonetic-acoustic data sequences, but simple phonemes alone cannot generally model the difficult transition periods between the more steady state central sections, leading to unnatural sounding speech. Diphone and demi-syllable segments have therefore been popular for text-to-speech systems precisely because they do attempt to capture these transition regions, and can conveniently yield locally intelligible acoustic waveforms.

An additional problem with the concatenation of phoneme-sized, or larger, units is the need to modify each segment according to the precise prosodic requirements and the intended context. Some approaches have used an LPC representation of the audio signal so that its pitch can be easily modified. Other approaches have used the pitch-synchronous-overlap-and-add (PSOLA) technique, such as disclosed by F. Charpentier and E. Moulines, Pitch Synchronous waveform processing techniques for text-to-speech synthesis using diphones, Proceeding EuroSpeech 89, Paris 1989, pp 13–19, to enable both pitch and duration to be modified for each segment of the complete output waveform. Both of these approaches introduce the possibility of degrading the quality of the output waveform, for example by introducing perceptual effects related to the excitation chosen, in the LPC case, or other unwanted noise due to accidental discontinuities between segments, in the PSOLA case. A method of waveform generation which does not require such modification, or keeps it to a minimum, would therefore be advantageous.

In most concatenative synthesis systems the determination of the actual segments is also a significant problem. If the segments are determined by hand the process is slow and tedious. If the segments are determined automatically they may contain errors which will degrade the voice quality. While automatic segmentation can be done with little or no operator intervention, for example by using a speech recognition engine in its phoneme recognizing mode, the quality of segmentation at the phonetic level may not be adequate to isolate good units. In this case some hand tuning would still seem to be needed.

Accordingly, the present invention provides a method for synthesizing speech comprising the steps of generating a sequence of sub-phoneme elements from the text, each sub-phoneme element representing a corresponding acoustic waveform, concatenating said sub-phoneme elements to produce an output waveform.

The present invention advantageously provides a very simple and effective manner of improving the quality of synthesized speech.

An embodiment provides a method wherein the step of generating comprises the steps of generating from said text corresponding speech elements, mapping each speech element to one of a plurality of sub-phoneme elements to produce said sequence.

The mapping may be advantageously performed using hidden markov modelling or similar time domain modelling method. Alternatively a look-up table might be used to map the speech elements to corresponding sub-phoneme elements.

An embodiment provides a method wherein said speech elements are phonemes. The phonemes can be derived from, for example, an input text. Alternatively, the speech elements may be syllables or diphones as are well known within the art.

A further aspect of the invention provides a method wherein each sub-phoneme element is a frequency domain representation of a corresponding acoustic waveform, and the step of concatenating comprises converting each frequency domain representation into a time domain representation and concatenating said time domain representations to produce said output waveform.

Each frequency domain representation can be converted to a time domain representation by using either inverse fourier transform techniques or a suitable look-up table.

The disadvantage of using a look-up table is that a very large number of sub-phoneme elements may be stored and a significant time penalty will be incurred as a consequence of having to search all table entries when looking to convert between the frequency and time domains.

Suitably, a further aspect provides a method wherein said sub-phoneme elements are produced by the steps of producing a set of first data elements by sampling an input acoustic waveform, producing the sub-phoneme elements from the set of first data elements by mapping each sub-phoneme element to at least one of the first data elements.

The sub-phoneme elements can be clustered using a k-means or similar algorithm as is known in the art of speech recognition.

The present invention also provides a system for implementing the above methods.

An embodiment of the present invention will now be described, by way of example only, with reference to the accompanying drawings in which.

Figure 1:
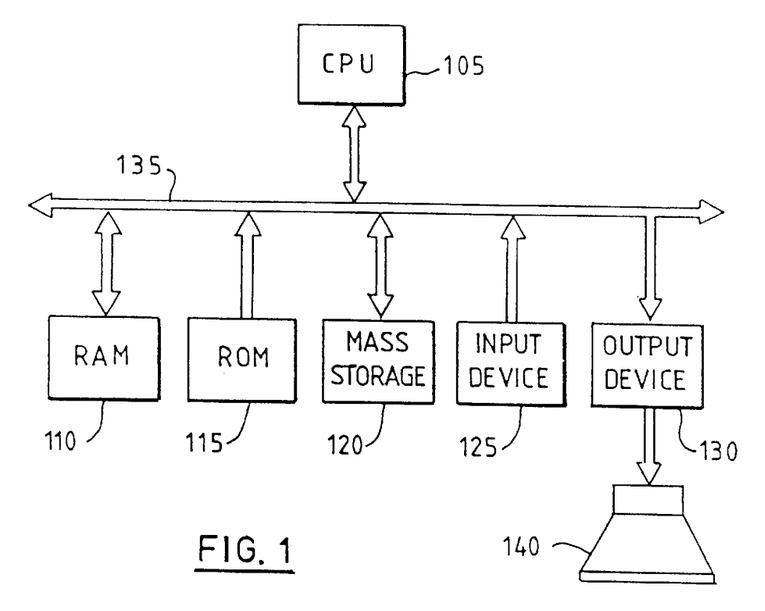
FIG. 1 is a simplified block diagram of a data processing system which may be used to implement the present invention.

FIG. 1 depicts a data processing system which may be utilized to implement the present invention, including a central processing unit (CPU) 105, a random access memory (RAM) 110, a read only memory (ROM) 115, a mass storage device 120 such as a hard disk, an input device 125 and an output device 130, all interconnected by a bus architecture 135. The text to be synthesized is input by the mass storage device or by the input device, typically a keyboard, and turned into audio output at the output device, typically a loud speaker 140 (note that the data processing system will generally include other parts such as a mouse and display system, not shown in FIG. 1, which are not relevant to the present invention). The mass storage 120 also comprises a data base of known syllables together with the probability of occurrence of the syllable. An example of a data processing system which may be used to implement the present invention is a RISC System/6000 equipped with a Multimedia Audio Capture and Playback Adapter (M-ACPA) card, both available from International Business Machines Corporation, although many other hardware systems would also be suitable.

Figure 2:
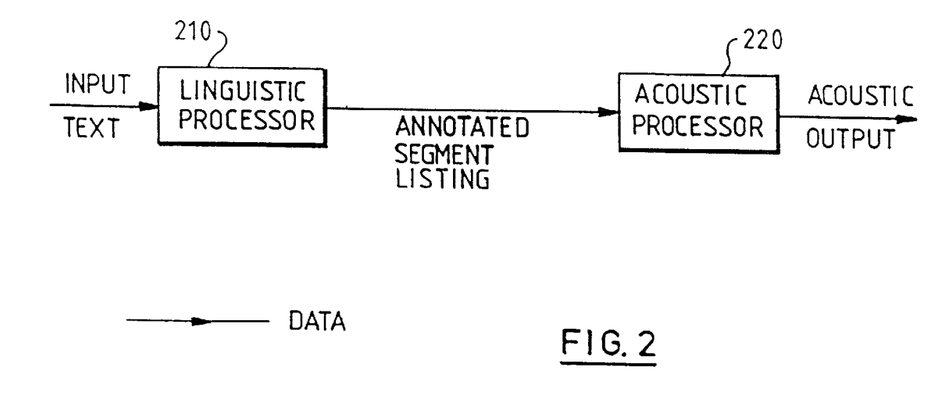
FIG. 2 is a high level block diagram of a text to speech system.

FIG. 2 is a high-level block diagram of the components and command flow of the speech synthesis system. As in the prior art, the two main components are the linguistic processor 210 and the acoustic processor 220. These perform essentially the same task as in the prior art, i.e., the linguistic processor receives input text, and converts it into a sequence of annotated phonetic segments. This sequence is then presented to the acoustic processor, which converts the annotated phonetic segments into output sounds. The sequence of annotated phonetic segments comprises a listing of phonemes (sometimes called phones) plus pitch and duration values. However other speech segments (eg syllables or diphones) could easily be used, together with other information (eg volume).

Figure 3:
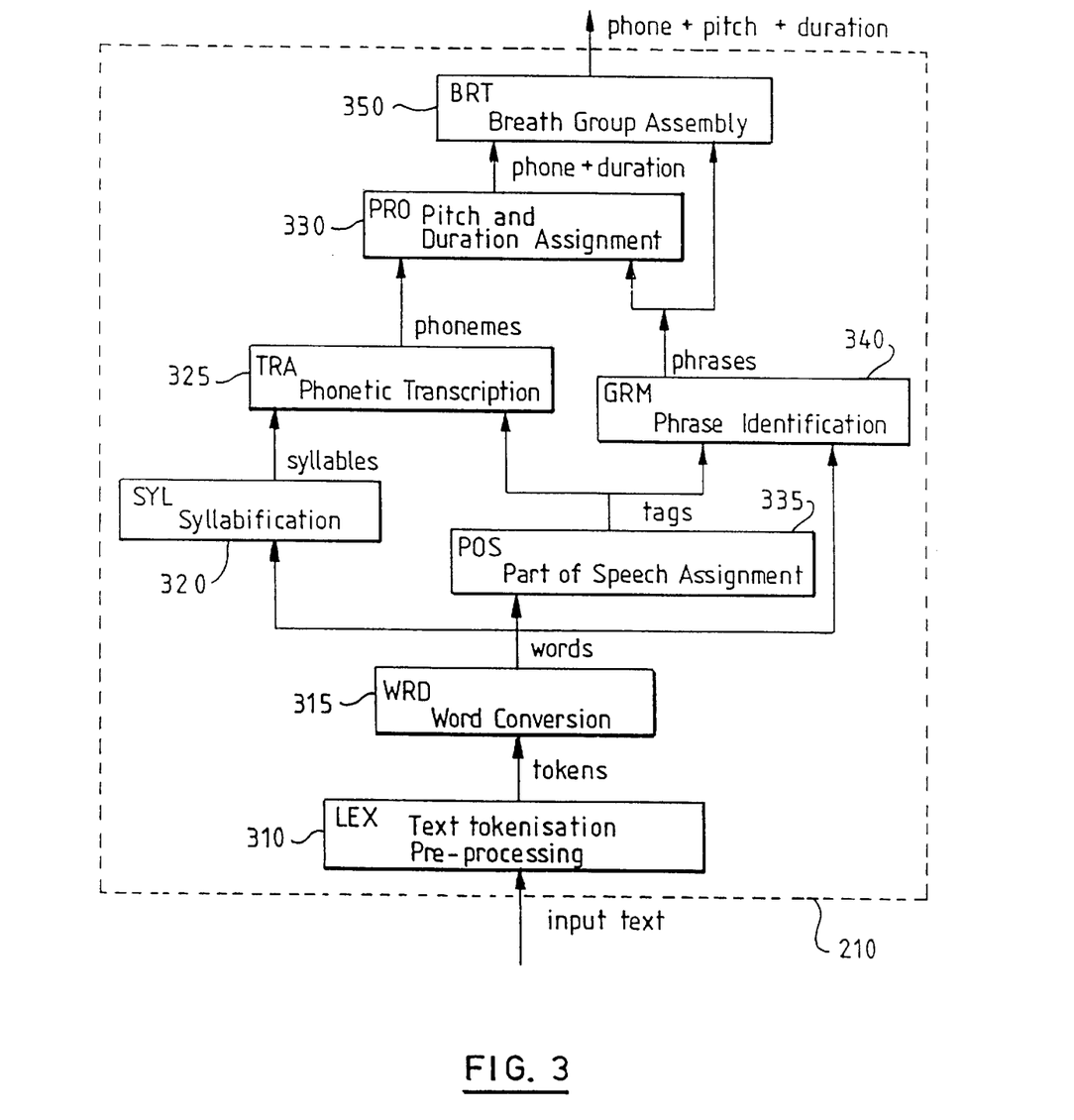
FIG. 3 illustrates the structure of a linguistic processor together with the data flow internal to the linguistic processor.

FIG. 3 illustrates the structure of the linguistic processor 210 itself, together with the data flow internal to the linguistic processor. Such a linguistic processor is well-known in the art to the skilled addressee.

The first component 310 of the linguistic processor (LEX) performs text tokenisation and pre-processing. The function of this component is to obtain input from a source, such as the keyboard or a stored file, performing the required input/output operations, and to split the input text into tokens (words), based on spacing, punctuation, and so on. The size of input can be arranged as desired; it may represent a fixed number of characters, a complete word, a complete sentence or line of text (i.e., until the next full stop or return character respectively), or any other appropriate segment. The next component 315 (WRD) is responsible for word conversion. A set of ad hoc rules are implemented to map lexical items into canonical word forms. Thus for example numbers are converted into word strings, and acronyms and abbreviations are expanded. The output of this state is a stream of words which represent the dictation form of the input text, that is, what would have to be spoken to a secretary to ensure that the text could be correctly written down. This needs to include some indication of the presence of punctuation.

The processing then splits into two branches, essentially one concerned with individual words, the other with larger grammatical effects (prosody). Discussing the former branch first, this includes a component 320 (SYL) which is responsible for breaking words down into their constituent syllables. The next component 325 (TRA) then performs phonetic transcription, in which the syllabified word is broken down still further into its constituent phonemes, for example, using a dictionary look-up table. There is a link to a component 335 (POS) on the prosody branch, which is described below, since grammatical information can sometimes be used to resolve phonetic ambiguities (eg the pronunciation of "present" changes according to whether it is a vowel or a noun).

The output of TRA is a sequence of phonemes representing the speech to be produced, which is passed to the prosody assignment component 330 (PRO). This sequence of phonemes is eventually passed from the linguistic processor to the acoustic processor, along with annotations describing the pitch and durations of the phonemes. These annotations are developed by the components of the linguistic processor as follows. Firstly the component 335 (POS) attempts to assign each word a part of speech. There are various ways of doing this: one common way in the prior art is simply to examine the word in a dictionary. Often further information is required, and this can be provided by rules which may be determined on either a grammatical or statistical basis; eg as regards the latter, the word "the" is usually followed by a noun or an adjective. As stated above, the part of speech assignment can be supplied to the phonetic transcription component (TRA).

The next component 340 (GRM) in the prosodic branch determines phrase boundaries, based on the part of speech assignments for a series of words; eg conjunctions often lie at phrase boundaries. The phrase identifications can use also use punctuation information, such as the location of commas and full stops, obtained from the word conversion component WRD. The phrase identifications are then passed to the breath group assembly unit BRT as described in more detail below, and the prosody assignment component 330 (PRO). The prosody assignment component combines the phrase information with the sequence of phonemes supplied by the phonetic transcription TRA to determine an estimated duration for each phoneme in the output sequence. Typically the durations are determined by assigning each phoneme a standard duration, which is then modified in accordance with certain rules, eg the identity of neighboring phonemes, or position within a phrase (phonemes at the end of phrases tend to be lengthened). An alternative approach using a Hidden Markov model (HMM) to predict segment durations is described in co-pending application GB 9412555 (UK9-94-007).

The final component 350 (BRT) in the linguistic processor is the breath group assembly, which assembles sequences of phonemes representing a breath group. A breath group essentially corresponds to a phrase as identified by the GRM phase identification component. Each phoneme in the breath group is allocated a pitch, based on a pitch contour for the breath group phrase. This permits the linguistic processor to output to the acoustic processor the annotated lists of phonemes plus pitch and duration, each list representing one breath group.

Consequently, the acoustic processor receives the phonemes for output waveform synthesis: this can be achieved by the concatenation of very small, sub-phoneme sized, units. These units are known from speech recognition techniques, and when correctly selected and concatenated into very long sequences, form complete waveforms producing acceptable and intelligible, natural sounding speech. A particular advantage is that the approach creates a computationally viable method of capturing information about a particular speaker and provides an automatic method realizing speaker dependent speech synthesis. The principle of the method is outlined below, and a procedure for building such a system is described.

Figure 4:
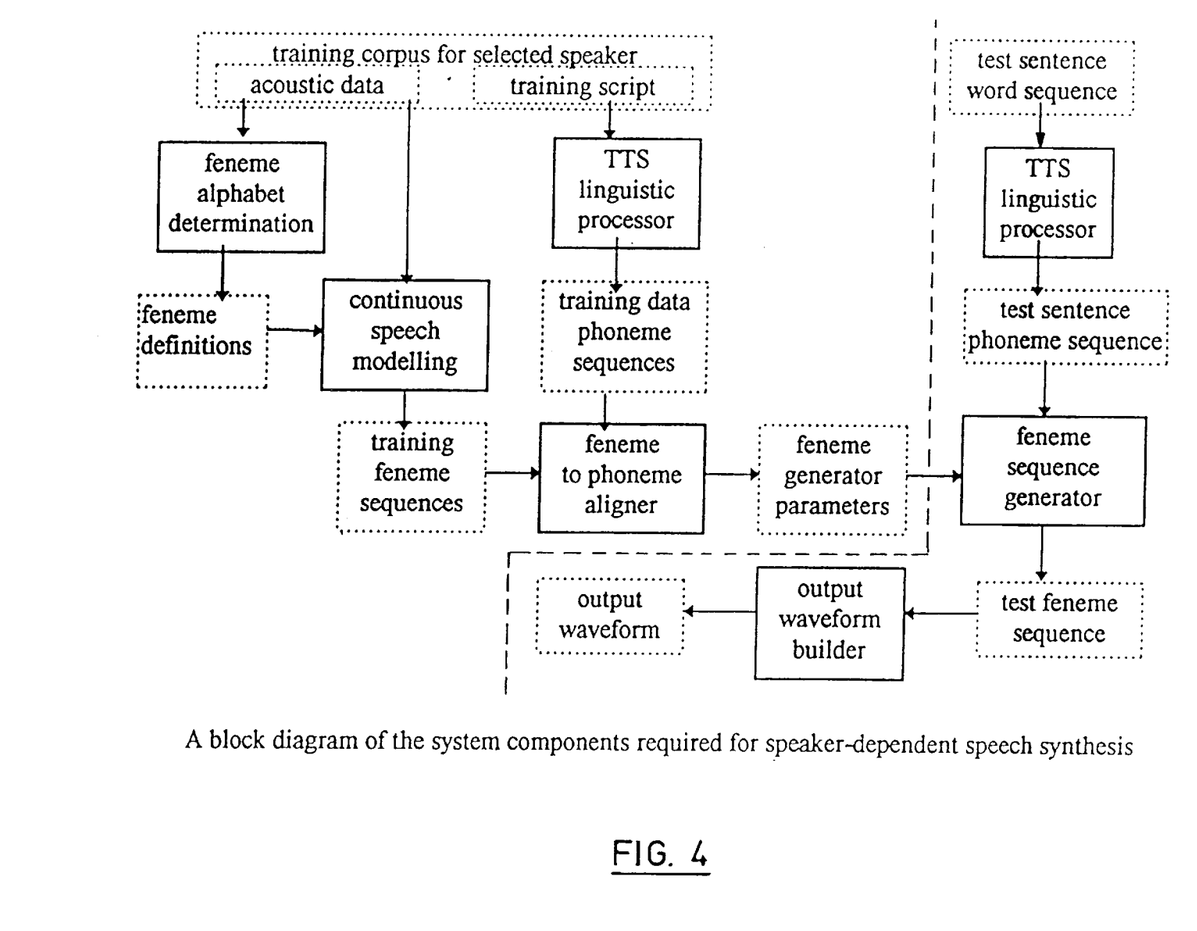
FIG. 4 illustrates the components of a speech synthesis system according to an embodiment.

FIG. 4 shows the components of a speech synthesis system for determining a set of sub-phoneme units known as fenemes. Fenemes are derived from clusters of fenones. A fenone is a frequency domain representation a sample of speech taken over a very short period of time. The processing components of the diagram are described in more detail below. The diagram is divided into two parts. The left-hand side schematically illustrates the components which determine a set of fenemes whereas the right-hand side schematically represents the components of a speech synthesis system according to an embodiment. If a predetermined set of fenemes is already available then the left-hand side of FIG. 4 is not needed. However, the left-hand side of FIG. 4 can be used for training on different speakers in order to enable speech to be synthesized which sounds like a given speaker. In the diagram data items are denoted by boxes with dashed outlines, and processing algorithms are denoted by boxes with solid outlines. Arrows indicate the movement of data.

The processing components of the system pictured above are described in more detail:

I. Feneme alphabet determination: A fenone is a sample of a waveform at a particular point in time. The training data is analyzed for individual pitch periods, and fenones are extracted, one per pitch period (as for speech recognition). The fenones are each labelled with FFT coefficient vectors for each actual fenone. A feneme is a unique sample of a waveform specific to a given speaker. The fenone vectors are clustered for the given speaker, and quantized to create a finite set of fenemes which are unique to the speaker. The size of the feneme alphabet is important in determining the degree to which the fenemes will generalize on subsequent generation of an output waveform for speech synthesis. The alphabet comprises between 320 and 10,000 fenemes.

II. Continuous speech modelling: The equivalent feneme sequences for the fenones observed in the training corpus are generated, using the fenone clusters determined.

III. TTS linguistic processor: The words of the training script are converted to phoneme sequences, using the linguistic processing stage of the text-to-speech system itself as is known in the art.

IV. Feneme to phoneme aligner: The phonemes of the training script are aligned with the feneme sequences of the observed speech corpus by the viterbi alignment of a hidden markov model which has been trained by the forward-backward algorithm on this task. Note that this is very similar to the initial stages of analysis in some speech recognition systems. It is clearly essential to have a training script which is large enough to contain a sufficient number of examples of all common phonetic contexts so that the subsequent TTS synthesis will have a good coverage.

V. Feneme sequence generator: A model of phoneme to feneme conversion can be created using the training data generated in the previous step. It is worth noting one significant departure from general language modelling practice here, which is that no attempt to "smooth" the model is be made here, since, unlike normal n-gram modelling, it is required to generate actual fenemes sequences and not recognize unobserved new sequences.

VI. Output Waveform Build: The expected feneme sequence for a given phoneme sequence is converted into an actual waveform by one of a variety of methods. The preferred method adopted here is to use direct concatenation of actual segments in the time domain by PSOLA techniques. It is at this stage that the desired pitch modification can take place. It should be noted that the durational modelling is either automatically taken care of within the feneme sequence generation or by prior assignment although the more general conversion appropriate to overall speaking rate can be performed by PSOLA methods as well.

The stages of processing described are completely automated so that the steps can be repeated on any number of training corpus examples. Thus the process can be adapted at will to new speakers, or even, with suitable modifications, to new languages.

Figure 5:
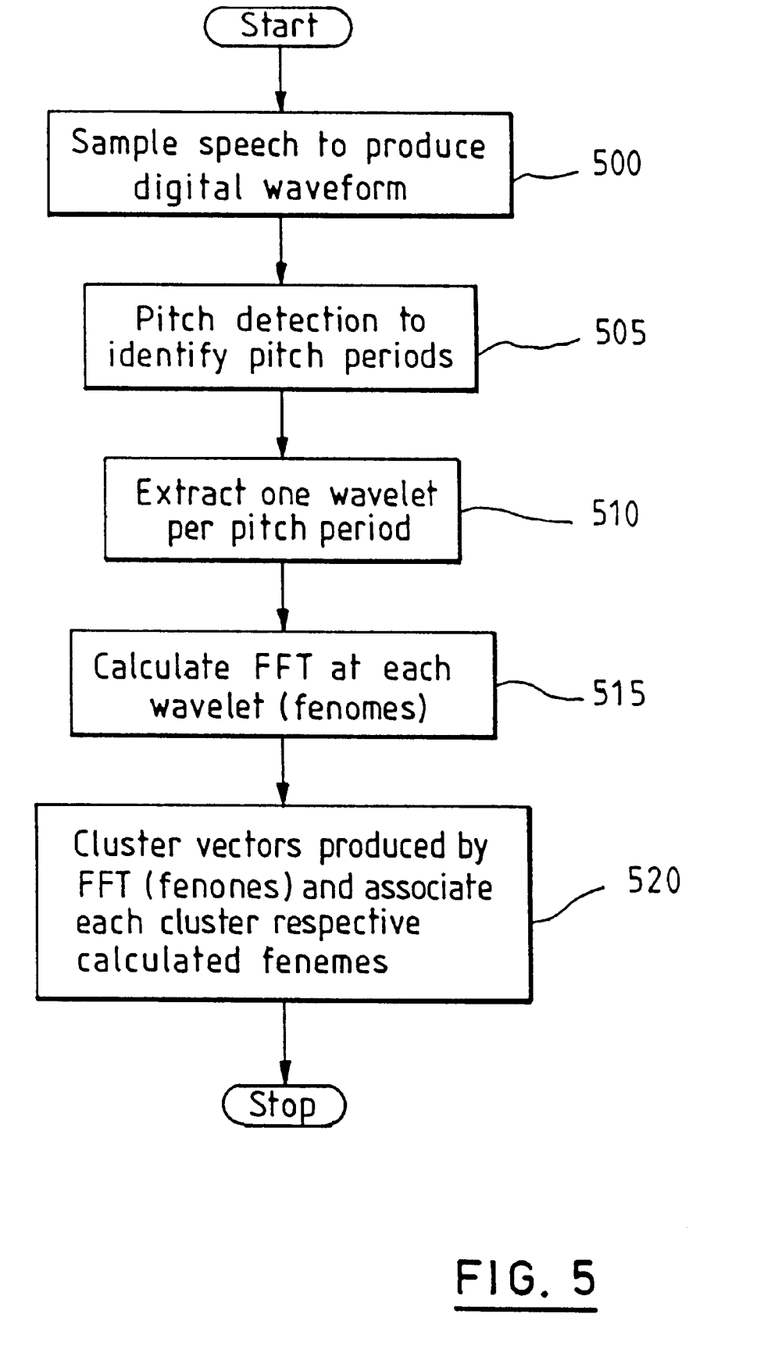
FIG. 5 illustrates a flow diagram for producing a set of fenemes.

Referring to FIG. 5, there is shown a flow diagram for producing a set of fenemes used for speech synthesis. Step 500 sets the sampling rate suitable for determining pitch periods for the range of normal speech and a text or training corpus is read by the speaker and sampled at the set sampling rate to produce a digital waveform. At step 505 the instantaneous fundamental frequency of a speaker's voice whose characteristics are to be synthesized is determined. The instantaneous fundamental frequency determines the size of the window which is applied to the samples. It will be appreciated that the instantaneous fundamental frequency varies and accordingly the duration of the fenemes will also vary. The beginning of a wave epoch is used as the center of the applied window. The feneme is derived from samples taken from either side of the center. A wavelet results from or is the effect of a single glottal pulse excitation on the acoustic tube of the voval tract which produces harmonics. Step 510 extracts from the digital waveform one wavelet per pitch period. Step 515 converts each of the time domain set of samples into the frequency domain. A fast fourier transform is used for such conversion. The vectors of coefficients, fenones, for each sample are clustered, at step 520, using, for example, a k-means algorithm to produce a set of fenemes which are representative of the fenones. The set of fenemes are used for later synthesis of speech.

The sampling of a speaker's voice, the characteristics of which are to be synthesized, can be effected using a microphone and an analogue to digital converter in conjunction with a suitably programmed digital signal processor as shown in FIG. 1.

Figure 6:
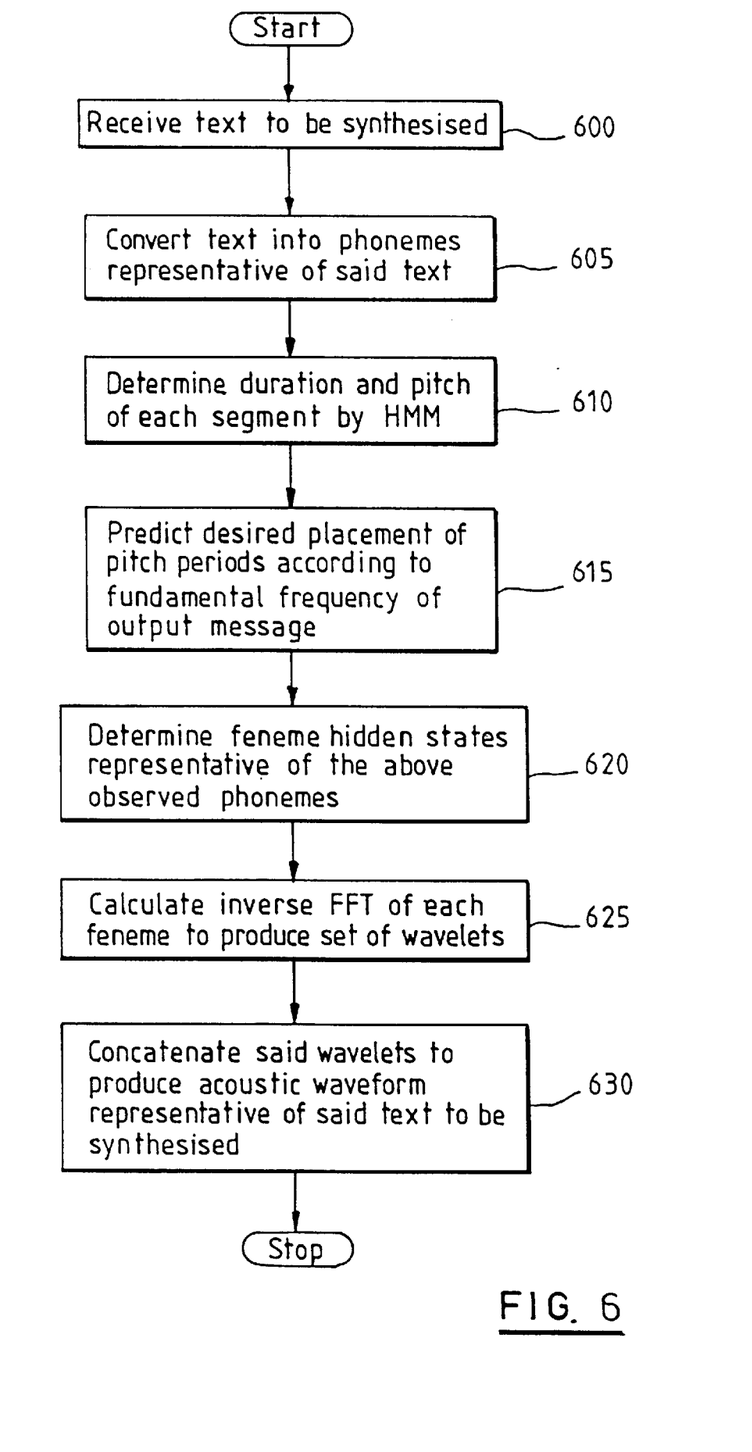
FIG. 6 illustrates a flow diagram for synthesizing speech using a set of fenemes.

FIG. 6 illustrates a flow diagram for synthesizing speech according to an embodiment. Step 600 receives text to be synthesized. Step 605 generates a sequence of phonemes which have been derived from text to be synthesized. A hidden markov model, having the phonemes as observed outputs, is used at step 610 to determine an underlying sequence of fenemes which may give rise to the sequence of phonemes. Each underlying sequence of fenemes is converted from the frequency domain into their time domain equivalent using an inverse fourier transform at step 625. The sequence of time domain equivalents are concatenated to produce the synthesized speech at step 630.

The theoretical motivation for the above system and method is described below.

Let an observed speech waveform, S, be denoted by a sequence of digital samples assuming some sampling rate suitable for establishing enough bandwidth to capture all the relevant frequencies, or $S=s_0, s_1, \ldots, s_n$. For example, at a sampling rate of 11.025 Khz, as used in standard multimedia audio adapters, there will be 11025 samples per second, and (n/11025) is the length of S in seconds. Now assume that consecutive groups of m samples can be identified and labelled. There is no requirement for each group to be the same length, although a fixed length is usually chosen for speech recognition work. In this case variable length groups are assumed. Each group of samples denotes a unique waveform segment, called a wavelet, and can be denoted by $w_i$. The waveform can be considered to be a sequence of adjacent, non-overlapping segments, or $S=W=w_0, w_1, \ldots, w_n$. Each wavelet can be uniquely labelled with an index number, i, giving a sequence of labels $L=l_0, l_1, \ldots, l_i, \ldots$ which can be called fenones. A fenone has an associated spectrum obtained, for example, by using the fast fourier transform to obtain a vector of discrete fourier transform coefficients for the corresponding wavelet.

Now suppose a new sequence of fenones, $L'=l'_0, l'_1, \ldots, l'_n$, is constructed according to some principle. Clearly the corresponding waveform can be generated by selecting the wavelet, $w'_i$, which corresponds to each new fenone, $l'_i$, for each $i=0,1,\ldots,m$. In principle the selection can be done by a simple lookup table, and the final waveform is obtained by concatenating the corresponding wavelets, giving $S=W=w'_0, w'_1, \ldots, w'_n$. In practice, discontinuities at wavelet boundaries can be smoothed by applying a window, say a Hanning window, to a larger section of the waveform, and performing pitch synchronous overlap-and-add of adjacent wavelets as in the PSOLA technique. Since each wavelet may contain inherent traces of the fundamental frequency at which it was originally uttered, great care is need to be exercised in choosing the precise sequence of fenones so that realistic pitch movements are perceived in the final waveform. It should be noted that the pitch assignment can, of course, be solved by either selecting the correct fenone from a set of similar fenones differing only by their pitch, or by modifying a single fenone by a standard LPC or PSOLA waveform modification technique.

The main drawback of the simple method just described is that a very large inventory of fenones would be required, even given the fact that identical ones (where they exist in the training corpus) can be coalesced. Because truly identical fenones do not often occur (except in silence or noise) there could be the order of a hundred thousand fenones in a typical training corpus of about 1 hour of speech, given the parameters specified above for sample rate and fenone rate. Another difficulty would be the choice of a strategy for deciding which fenone to select in order to build the desired output sequence. As such, the choice of fenone would represent an enormous search problem.

In order to simplify the search problem, and reduce the number of items which can be selected, the fenones are clustered into an equivalent set of labels, which may be called fenemes. Fenemes can be considered to be unique numbers, but it is also useful to associate mnemonic text labels for ease of understanding. Thus, for example, fenone number 126 might belong to the cluster denoted by feneme 35 which could be labelled AE1_2, indicating a portion of an AE1 phoneme.

The feneme is thus considered to be a generic sub-phoneme unit, used in potentially many different contexts, and which is typically of the order of a few milliseconds. The lower limit on the size of a feneme is a single fundamental frequency wave epoch, and is determined in part by the base pitch of the speaker being modeled. The pitch of male voices typically range between 80 Hz and 150 Hz. The pitch of female voices typically range between 120 Hz and 240 Hz. However, voices, in exceptional circumstances, can have a pitch of between 50 Hz and 500 Hz. Accordingly, the duration of fenemes varies between 2 milliseconds and 20 milliseconds. It is a basic assumption of this approach that there exists a useful clustering of fenones which will both significantly reduce the number of fenemes, and yet not introduce any unwanted perceptual effects which could degrade the output waveform. Of course in the limit, when the number of fenemes is equal to the number of fenones, a perfect waveform could conceptually be constructed (at least for utterances similar to the training corpus). Clustering of the fenones for speaker-dependent speech recognition might yield as few as 1000 fenemes.

The fenones can be clustered into a set of fenemes by standard methods of vector quantization, for example by the use of the k-means algorithm, as disclosed by J. Makhoul, S. Roukos, and H. Gish, Vector Quantization in Speech Coding, Proceedings of the IEEE, vol. 73 No. 11, Nov. 1985, pp 1551–1588, to cluster wavelets with similar features, creating a codebook of labels of a fixed size. The fenemes are then said to be trained on the observed corpus. Each feneme represents the centroid of a group of fenones, and can thus be associated with a wavelet by either choosing one of the fenones in the set (perhaps the nearest) or simply by choosing an arbitrary member of the fenone set (for example the first, or the seed value for the given cluster). Alternatively, each feneme may be calculated as the average of a respective cluster of fenones.

Given the set of fenemes, the problem remains to predict the sequence of fenemes required to achieve a particular output utterance. The method uses language modelling techniques to predict the desired feneme sequence, given the required sequence of phonemes specified by the initial linguistic processing of the text-to-speech system. This can be done by using, for example, a n-gram hidden markov model(HMM) trained on the original speaker dependent speech corpus. The equation to be solved must relate the observed phonemes in terms of an underlying (hidden) feneme sequence. This is the maximization of the conditional probability of a model producing the observed sequence of phonemes, $F=f_1, f_2, \ldots, f_n$, given any feneme label sequence, $L=l_1, l_2, \ldots, l_n$, or $$\max_L [P(F|L)] = \max_L [P(L|F)P(L)|P(F)],$$

which amounts to finding $\max_L [(L|F)P(L)],$

This model can be initialized by extracting counts from a previously aligned corpus of phoneme and feneme sequences. The model can be further trained by standard HMM modelling techniques to create a general purpose model for predicting fenemes from phonemes (see "A tutorial on hidden markov models and selected applications in speech recognition", by Rabiner, Procs IEEE, Vol 77, No.2, Feb 1990 and "An Introduction to the application of the theory of probabilistic functions of a Markov process to automatic speech recognition", by Levison et al, The Bell System Technical Journal, Vol. 62, No.4, April 1983).

First, the training corpus is analyzed to determine the equivalent feneme sequences in the way described above, and then these feneme sequences are aligned with the known phoneme sequences using the Forward-Backward algorithm to train a suitably chosen HMM. This is standard practice in speech recognition methods to obtain a mechanism for labelling a speech corpus automatically with the corresponding phonemes. The process is not entirely error-free but is accurate. Now that an HMM exists trained to model phoneme-to-feneme mapping, it is a simple matter to use the HMM generatively to produce typical feneme sequences when given an arbitrary phoneme input sequence.

A constraint on the model is the expected duration of the phoneme output; that is, the number of fenemes which must be processed in order to output a single phoneme. Without this constraint the model could only be expected to output rather short sequences.

A complex waveform is created by the concatenation of phonemes, each with its specified duration. A phoneme is created by the concatenation of fenemes, each placed on a pitch period determined by the fundamental frequency of the speech at each point during the phoneme. In order to generate a sequence of feneme labels for a given phoneme an nth order HMM is used to calculate $$\max[P(l_i|l_{i-n+1}, \ldots, l_{i-1})]$$

$(1 \leq i \leq m), (l_i \epsilon L)$ where, typically, n=3, and m=length of the output sequence for a phone, subject to the constraint that $$\prod_{i=1}^{k} [P(l_i|l_{i-n+1}, \ldots, l_{i-1})] = 0, \text{ if } k = m$$

This ensures that only sequences of length m are considered in the choice of possible outputs for a given phone, and that the maximization is carried out with respect to such a sequences.

The parameters of the HMM used to generate feneme sequences are calculated by first counting the frequency of occurrence of feneme sequences in the training data and making the initial assumption that $$P(l_i|l_j) = [C(l_i,l_j)/C(l_j)]$$

for all i and j where C(x) denotes the count of events of type x. This estimate of probability by relative frequency is not adequate if the counts approach zero, typically due to sparse or incomplete training data. In that case smoothing of the estimates by Turing's approximation, or by a method such as deleted interpolation is used as is known in the art, or described in Automatic Speech Recognition, by K. F. Lee, Kluwer Academic Publishers, 1989.

Finally, once a feneme sequence has been constructed, the actual output waveform can be generated in the way indicated above. The wavelets can be encoded as LPC coefficients. Alternatively, direct waveform concatenation using PSOLA methods, while more expensive in terms of storage requirements, can be shown to be very efficient computationally if all the operations are carried out in the time-domain.

In an example analysis system, a corpus of 150 sentences of English was recorded from a single speaker, comprising about one hour of audio recording at 11 Khz. The sentences were divided into 100 training and 50 test sentences. Approximately 350,000 fenones were clustered into 320 fenemes, and each feneme labelled according to its typical occurrence in one of four positions for each corresponding phoneme, there being 80 phonemes (stressed and unstressed vowels being distinguished). The training sentences were generated in their fenemic form, and the phonemes and fenemes aligned by a hidden markov model. A feneme generator model was constructed as the inverse hidden markov model using the aligned data as training data.

For each of the test sentences a phoneme string, with associated duration and pitch values was generated, using language modelling techniques also derived from the same speaker and the invention disclosed in co-pending application GB 9412555.6. The accuracy of the generated duration values can be seen from the following example, depicted in FIG. 7, taken from the test set, which compares the calculated durations with the actual durations. The major discrepancy in the example shown is the error in the central portion where a phrase final lengthening is not correctly modelled. The durational model is a closer approximation to the observed values where the local context gives a good indication of the likely segment duration, as would be expected from the type of modelling being undertaken. If higher level constraints, such as the grammatical structure of the sentence, were to be taken into account, then it would be possible to improve the accuracy of prediction for phenomena such as phrase final lengthening.

The example sentence is "The first thing you need to know is how to speak to this computer", which has been transcribed as the phoneme sequence, X, DH, UH0, F, ER1, S, T, TH, I1, J, UU1, N, EE1, D, T, UU1, N, OU1, I1, Z, H, AU1, T, UU1, S, P, EE1, K, T, UU1, DH, I1, S, K, UH0, M, P, J, UU1, T, ER0, X. The phoneme symbols are principally taken from the International Phonetic Alphabet with modifications for marking stressed and unstressed syllables, and transcribing to printable characters for purposes of computer processing. The system is the same as that used in a speech recognition system.

Using the sequence of phonemes and their durations generated, the feneme sequence for each test sentence is then generated. An example of a typical phoneme-feneme alignment is shown below, for the words "the first thing you need to know" as the start of the test sentence, above.

| | |
|---|---|
| (...:X): | D$_2 D$_3 D$_2 D$_3 D$_3 D$_3 D$_2 D$_2 D$_2 D$_2 D$_2 D$_2 D$_2 D$_3 D$_3 D$_3 D$_3 D$_3 D$_3 D$_3 D$_2 ONF_3 PO_2 |
| (254:DH): | ONL_2 ONDH3 ONDH3 PO_1 DH_1 |
| (259:UH0): | UH0_1 UH0_1 UH0_1 |
| (262:F): | B_2 B_2 TH_2 TREE2 TREE2 F_2 TREE3 F_3 F_3 F_3 D$_3 F_3 F_4 F_4 |
| (276:ER1): | PO_1 ER1_1 ER1_1 ER1_1 ER1_1 ER1_2 ER1_2 ER1_2 ER1_3 ER1_3 ER1_3 ER1_3 ER1_3 ER1_3 |
| (290:S): | S_2 S_2 S_2 S_2 S_2 Z_3 S_3 S_4 S_4 Z_4 Z_4 T_1 TRS_2 TRS_2 TRS_3 |
| (305:T): | T_4 T_4 P_4 V_1 |
| (309:TH): | DH_1 DH_3 DH_1 DH_4 DH_4 DH_4 |
| (315:I1): | I1_1 I1_2 I1_2 UH0_1 |
| (319:NG): | NG_2 NG_2 NG_2 NG_3 NG_3 NV_3 N_3 N_3 N_3 |
| (328:J): | EE1_2 EE1_2 EE1_2 J_2 J_2 J_2 J_3 J_3 J_3 J_3 J_4 J_4 |
| (340:UU1): | UU0_1 |
| (341:N): | NV_2 NV_2 NV_2 N_2 ONM_4 NV_3 ONM_4 ONM_4 M_1 N_1 |
| (351:EE1): | EE1_1 EE1_1 EE1_1 EE1_2 EE1_2 EE1_2 EE1_2 EE1_2 EE1_2 EE1_3 EE1_3 I0_4 TREE1 K_2 TREE2 |
| (366:D): | TREE2 |
| (367:T): | TREE3 TRSH3 T_4 TO_2 TO_2 TO_2 TO_3 TO_3 TO_3 TO_4 TO_4 |
| (378:UU1): | UH0_1 UH0_1 UH0_1 |
| (381:N): | ONM_3 NV_2 NV_2 N_1 N_3 N_4 ONM_4 ONM_4 M_1 |
| (390:OU1): | D_1 EH1_1 EH1_1 EH1_1 AU1_1 ?_1 ?_1 AU1_1 AU1_1 AE1_2 AE1_2 UG_2 UG_2 UG_2 IG_1 IG_1 UG_2 UG_2 UG_3 UG_3 UG_3 UG_3 UG_3 UG_3 UU1_3 UU1_3 UU1_3 UU1_3 L_4 TRL_2 TRL_2 TRL_2 TRL_2 |
| (423:I1): | X_1 TRM_3 D$_3 D$_2 D$_3 D$_2 D$_2 D$_2 D$_2 D$_2 D$_3 X_3 ONI_1 ONEE3 ONI_1 ONI_3 B_1 B_1 I0_1 I0_1 I0_1 |

The waveforms were then generated from the feneme sequences.

Figure 7:
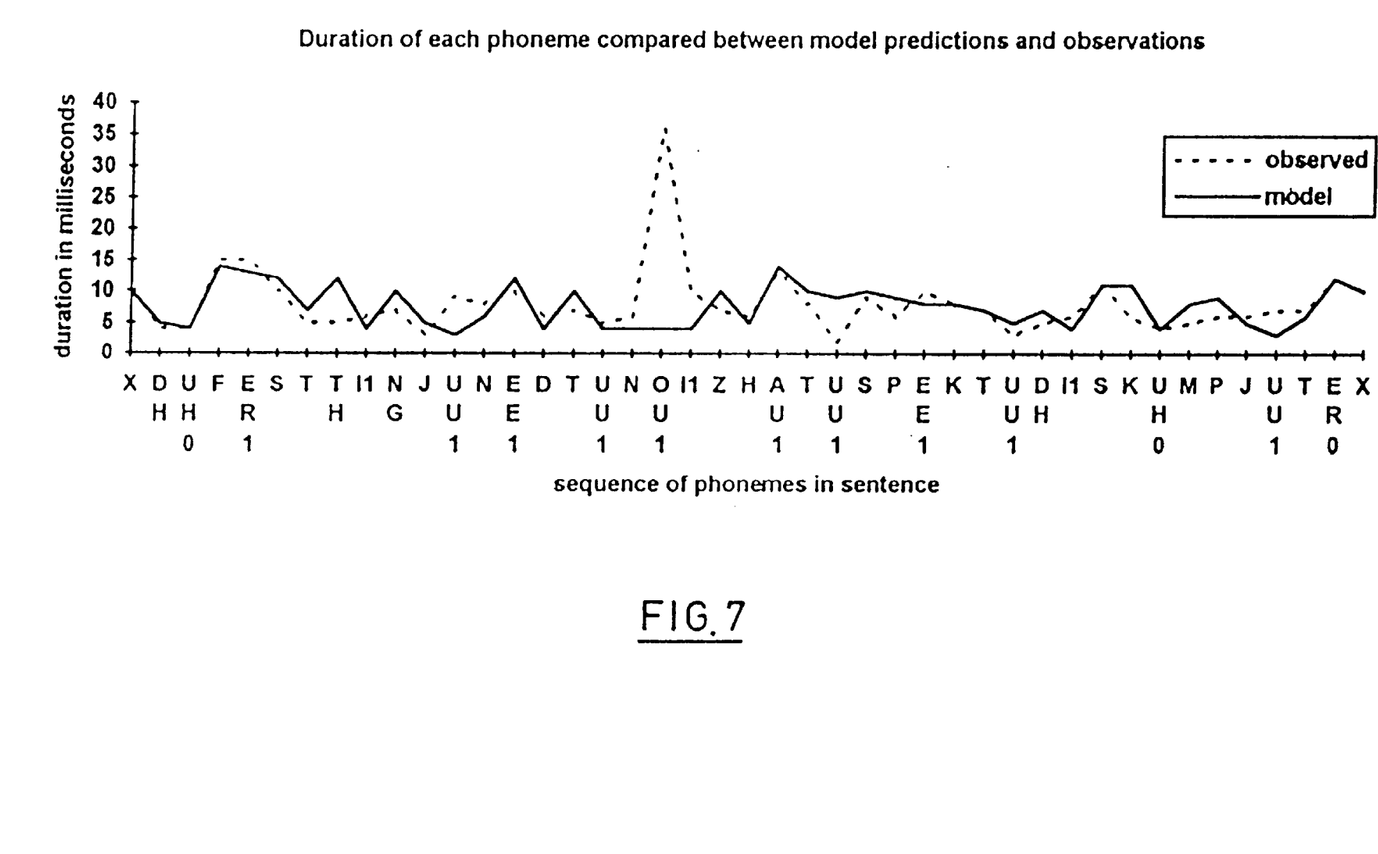
FIG. 7 illustrates a graph of phonemes against phoneme duration for actual observations and predictions.

FIG. 7 illustrates a graph of phoneme sequence against phoneme duration for both predictions according to an embodiment and actual observations. The predictions were made using an n-gram hidden markov model where n was equal to three. A greater correlation between actual and predicted observations results from increasing the value of n in the n-gram model. Typical alternative values are n=5, 6 or 7.

Concatenative synthesis according to the above embodiment results in some desirable properties. It captures speaker-dependent characteristics so that natural sounding speech may be synthesized. Larger segments of speech, such as diphones, demi-syllables, etc. can be modelled by the concatenation of a long sequence of sub-phoneme sized segments. The selection of segments can be motivated by, and to some extent synchronized with, the types of segments used in speech recognition systems for speaker-dependent speech recognition.

A further advantage of the present invention is that techniques used in speech recognition can be applied to speech synthesis resulting in a useful sharing of concepts, and algorithms. There are also various practical benefits in terms of the sharing of tools and corpora, which are also not insignificant. The sound produced is intelligible, and does have a quality recognisably like that of the original speaker.

I claim:

1. A method for synthesizing speech from text, comprising the steps of:
   generating a sequence of sub-phoneme elements from text, each sub-phoneme element representing a corresponding acoustic waveform; and
   concatenating said sub-phoneme elements to produce an output waveform, wherein said generating step comprises the steps of:
   generating from said text corresponding speech elements; and
   mapping each speech element to one or more of a plurality of sub-phoneme elements to produce said sequence.

2. A method as claimed in claim 1, wherein the mapping is performed using a hidden markov model in which the states represent the sub-phoneme elements and the outputs are the speech elements.

3. A method as claimed in claim 2, wherein the hidden markov model is an n-gram model, where n is at least three.

4. A method as claimed in claim 1 wherein said speech elements are phonemes.

5. A method as claimed in claim 1, wherein each sub-phoneme element is a frequency domain representation of a corresponding acoustic waveform, and the step of concatenating comprises converting each frequency domain representation into a time domain representation and concatenating said time domain representations to produce said output waveform.

6. A method as claimed in claim 1, wherein the step of concatenating comprises applying a window to each sub-phoneme element and concatenating together the result thereof in order to the mitigate the effect of discontinuities between said sub-phoneme elements.

7. A method as claimed in claim 1, wherein said sub-phoneme elements have durations of between 2 milliseconds and 20 milliseconds.

8. A method as claimed in claim 1, wherein the duration of a sub-phoneme element is no less than the inverse of the instantaneous fundamental frequency.

9. A method as claimed in claim 1, wherein said sequence of sub-phoneme elements is generated from an alphabet comprising between 300 and 10,000 sub-phoneme elements.

10. A method as claimed in claim 1, further comprising the step of generating an alphabet of sub-phoneme elements.

11. A method as claimed in claim 10, wherein the step of generating said alphabet comprises the steps of producing a set of first data elements by sampling an input acoustic waveform, clustering said first data elements, and generating a sub-phoneme element for each cluster of first data elements.

12. A method as claimed in claim 11, wherein said step of clustering is effected using a k-means algorithm.

13. A system for synthesizing speech from text, the system comprising:

means for generating a sequence of sub-phoneme elements from text, each sub-phoneme element representing a corresponding acoustic waveform; and means for concatenating said sub-phoneme elements to produce an output waveform, wherein said means for generating comprises:

means for generating from said text corresponding speech elements; and means for mapping each speech element to one or more of a plurality of sub-phoneme elements to produce said sequence.

14. A system as claimed in claim 13, wherein the mapping is performed using a hidden markov model in which the states represent the sub-phoneme elements and the outputs are the speech elements.

15. A system as claimed in claim 14, wherein the hidden markov model is an n-gram model, where n is at least three.

16. A system as claimed in claim 13, wherein said speech elements are phonemes.

17. A system as claimed in claim 13, wherein each sub-phoneme element is a frequency domain representation of a corresponding acoustic waveform, and the means for concatenating comprises means for converting each frequency domain representation into a time domain representation and concatenating said time domain representations to produce said output waveform.

18. A system as claimed in claim 13, wherein the means for concatenating comprises means for applying a window to each sub-phoneme element and for concatenating together the result thereof in order to the mitigate the effect of discontinuities between said sub-phoneme elements.

19. A system as claimed in claim 13, wherein said sub-phoneme elements have durations of between 2 milliseconds and 20 milliseconds.

20. A system as claimed in claim 13, wherein the duration of a sub-phoneme element is no less than the inverse of the instantaneous fundamental frequency.

21. A system as claimed in claim 13, wherein said sequence of sub-phoneme elements is generated from an alphabet comprising between 300 and 10,000 sub-phoneme elements.

22. A system as claimed in claim 13, further comprising means for generating an alphabet of sub-phoneme elements.

23. A system as claimed in claim 22, wherein the means for generating said alphabet comprises means for producing a set of first data elements by sampling an input acoustic waveform, means for clustering said first data elements, and means for generating a sub-phoneme element for each cluster of first data elements.

24. A system as claimed in claim 23, wherein said means for clustering is effected using a k-means algorithm.

25. A method for synthesizing speech from text, comprising the steps of:

converting the text into a sequence of phonemes representative of the text;

generating a sequence of fenemes representative of the sequence of phonemes;

transforming the sequence of fenemes into a sequence of wavelets; and concatenating the sequence of wavelets to produce an acoustic waveform representative of the text.

* * * * *